United States Patent
Johnson et al.

(10) Patent No.: US 9,695,867 B2
(45) Date of Patent: Jul. 4, 2017

(54) RESONANCE TESTING APPARATUS AND ARTICULATION ASSEMBLY

(71) Applicant: Johnson & Allen Ltd., Sheffield (GB)

(72) Inventors: Jon Johnson, Sheffield (GB); Graham Morley, South Yorkshire (GB)

(73) Assignee: Johnson & Allen Ltd., Sheffield (GB)

( * ) Notice: Subject to any disclaimer, the term of this patent is extended or adjusted under 35 U.S.C. 154(b) by 533 days.

(21) Appl. No.: 14/189,084

(22) Filed: Feb. 25, 2014

(65) Prior Publication Data

US 2014/0169859 A1 Jun. 19, 2014

Related U.S. Application Data

(63) Continuation of application No. 13/094,956, filed on Apr. 27, 2011, now Pat. No. 8,667,843.

(30) Foreign Application Priority Data

Aug. 18, 2010 (GB) .................................. 1013819.6

(51) Int. Cl.
| | |
|---|---|
| F16C 11/06 | (2006.01) |
| F16C 11/10 | (2006.01) |
| G01M 7/02 | (2006.01) |

(52) U.S. Cl.
CPC ........... *F16C 11/106* (2013.01); *G01M 7/027* (2013.01); *Y10T 403/32311* (2015.01)

(58) Field of Classification Search
CPC .................. F16C 11/106; G01M 7/027; Y10T 403/32311
USPC .......................................................... 73/579
See application file for complete search history.

(56) References Cited

U.S. PATENT DOCUMENTS

| | | | |
|---|---|---|---|
| 409,744 A | 8/1889 | Garben | |
| 3,122,664 A | 2/1964 | Loeb | |
| 3,648,404 A | 3/1972 | Ogsbury et al. | |
| 4,170,425 A | 10/1979 | Brown | |
| 4,685,649 A | 8/1987 | McKay | |
| 4,834,519 A * | 5/1989 | Twisselmann | B23Q 1/28 359/384 |
| 5,465,946 A * | 11/1995 | Smith | B23Q 1/0027 248/288.51 |

(Continued)

FOREIGN PATENT DOCUMENTS

JP 60015538 1/1985

*Primary Examiner* — Laura Martin
*Assistant Examiner* — Rose M Miller
(74) *Attorney, Agent, or Firm* — Dinsmore & Shohl LLP

(57) ABSTRACT

A resonance testing apparatus has a plurality of arms for supporting a workpiece. At least one of said arms incorporates an articulation assembly having: a strut, a joint element which is movable in response to movement of the strut, and a clamp arrangement for clamping the joint element. The assembly has a first condition in which the joint element is movable and a second condition in which the clamp arrangement acts on the joint element to damp or restrict movement of the strut. The assembly includes a seating for the joint element, and a biasing arrangement for the seating. The assembly has a first condition in which the joint element is arranged on the seating and is movable on the seating and a second condition in which the biasing arrangement acts on the seating to damp or restrict movement of the joint element on the seating.

18 Claims, 2 Drawing Sheets

(56) References Cited

U.S. PATENT DOCUMENTS

| | | | |
|---|---|---|---|
| 5,590,870 A * | 1/1997 | Goellner | B25B 5/003 |
| | | | 269/21 |
| 6,264,522 B1 | 7/2001 | Dickson | |
| 8,365,598 B2 | 2/2013 | Menten et al. | |
| 2001/0023915 A1 * | 9/2001 | Hailson | F16C 11/106 |
| | | | 248/288.51 |
| 2006/0181092 A1 * | 8/2006 | Kikut | B25J 15/0052 |
| | | | 294/2 |
| 2009/0136290 A1 * | 5/2009 | Persson | B60R 11/0252 |
| | | | 403/125 |

* cited by examiner

RESONANCE TESTING APPARATUS AND ARTICULATION ASSEMBLY

CROSS-REFERENCE TO RELATED APPLICATIONS

This Application is a Continuation of application Ser. No. 13/094,956 filed on Apr. 27, 2011. application Ser. No. 13/094,956 claims priority of Application GB1013819.6 filed on Aug. 18, 2010 in the United Kingdom, the contents of which are incorporated herein in their entirety.

FIELD OF THE INVENTION

The present invention relates to resonance testing apparatus and to an articulation assembly of the kind suitable for use in resonance testing apparatus.

BACKGROUND OF THE INVENTION

A known resonance testing apparatus consists of a plurality of supports arms, the distal ends of which can be arranged to provide a cradle for a workpiece for the purpose of a testing operation. However, the relative position of the arms may need to be changed to accommodate different shapes and configurations of workpiece.

There is a need to provide an apparatus for use in resonance testing which is readily reconfigurable to accommodate different shapes and configurations of workpiece.

SUMMARY OF THE INVENTION

According to a first aspect, there is provided an articulation assembly having a strut, a joint element which is movable in response to movement of the strut, and a clamp arrangement for clamping the joint element, wherein the articulation assembly has a first condition in which the joint element is substantially free for movement and a second condition in which the clamp arrangement acts on the joint element to damp or restrict movement of the strut.

This aspect provides a convenient assembly for use in a reconfigurable apparatus for resonance testing. e.g. wherein the strut forms part of a support structure for a workpiece under test. Advantageously, the position of the strut can be locked or damped against movement when the assembly is in the second condition (e.g. for a resonance testing operation), whereas the position of the strut can be readily articulated to one of a plurality of a different positions when the assembly is in the first condition (e.g. for accommodating a different workpiece).

In exemplary embodiments, the strut is locked against movement when the assembly is in the second condition, e.g. for a resonance testing operation.

In exemplary embodiments, the strut extends from the joint element and may be connected to or integral with the joint element.

In exemplary embodiments, the clamp arrangement consists of opposing clamp members, and the joint element is located between the opposing clamp members.

In exemplary embodiments, the biasing arrangement is provided to cause the joint element to be clamped between the opposing clamp members.

In exemplary embodiments, the biasing arrangement includes a movable piston, and movement of the piston in a first direction causes the joint element to be clamped between the opposing clamp members. In exemplary embodiments, the piston is sealingly mounted in a cylinder arranged for communication with an hydraulic pressure source. In alternative embodiments, the piston may be movable in an apply direction response to pneumatic pressure, or in response to a linear actuator (e.g. an electric or electromagnetic linear actuator). The piston may be spring-biased in an apply direction in the cylinder, in order to provide a residual clamping force on the joint element.

In exemplary embodiments, the clamp arrangement provides a seating for supporting the joint element. The seating may be configured to permit movement of the joint element when the assembly is in the first condition.

In exemplary embodiments, the joint element is of metal construction and the seating is of plastics or resin material, for reducing wear between the joint element and the seating.

In exemplary embodiments, the joint element is spherical or substantially spherical. The joint element may be an elongate roller element of circular cross-section.

In exemplary embodiments, one of the clamp members defines a ring having an aperture through which the strut extends to the joint element.

The joint element, clamp members and piston may be mounted in a housing having an upper end and a lower end. In exemplary embodiments, the strut extends from the upper end of the housing. In exemplary embodiments, the lower end of the housing includes a recess for securably receiving the end of a strut from another articulation assembly of the same kind and configuration, for connecting a pair of such articulation assemblies together.

According to a second aspect, there is provided an articulation assembly, the articulation assembly including a joint element, a seating for the joint element, and a biasing arrangement for the seating, wherein the articulation assembly has a first condition in which the joint element is arranged on the seating and is substantially free for movement on the seating and a second condition in which the biasing arrangement acts on the seating to damp or restrict movement of the joint element on the seating.

This aspect provides a convenient assembly for use in a reconfigurable resonance testing apparatus. e.g. wherein a strut forming part of a support structure for a workpiece is connected to or integral with the joint element. Advantageously, the position of the is connected to or integral with the joint element (and, hence, the position of the strut) strut can be locked or damped against movement when the assembly is in the second condition (e.g. for a resonance testing operation on a workpiece supported by the strut), and can be articulated to one of a plurality of a different positions when the assembly is in the first condition (e.g. for accommodating a new workpiece).

In exemplary embodiments, the joint element is locked against movement when the assembly is in the second condition, e.g. for a resonance testing operation.

In exemplary embodiments, the articulation assembly includes a strut or stud extending from the joint element and the joint element is movable in response to movement of the strut or stud when the assembly is in the first condition, whereas the strut is damped or restricted against movement when the assembly is in the second condition. In exemplary embodiments, the strut is locked against movement when the assembly is in the second condition.

In exemplary embodiments, the seating consists of opposing clamp members and the joint element is located between the opposing clamp members. Preferably, the biasing arrangement is arranged to cause the joint element to be clamped between the opposing clamp members.

In one example, one of the clamp members defines a ring having an aperture through which the strut extends to the joint element.

In exemplary embodiments, the clamp arrangement provides a seating for supporting the joint element and permitting movement of the joint element when the assembly is in the first condition.

In exemplary embodiments, the joint element is of metal construction and the seating is of plastics or resin material, for reducing wear between the joint element and the seating.

In exemplary embodiments, the biasing arrangement includes a movable piston, and movement of the piston in a first direction causes the joint element to be clamped between the opposing clamp members. In exemplary embodiments, the piston is sealingly mounted in a cylinder arranged for communication with an hydraulic pressure source. In alternative embodiments, the piston may be movable in an apply direction response to pneumatic pressure, or in response to a linear actuator (e.g. an electric or electromagnetic linear actuator). The piston may be spring-biased in an apply direction in the cylinder, in order to provide a residual clamping force on the joint element.

In exemplary embodiments, the joint element is spherical or substantially spherical. The joint element may be an elongate roller element of circular cross-section.

The joint element, clamp members and piston may be mounted in a housing having an upper end and a lower end. In exemplary embodiments, the strut extends from the upper end of the housing. In exemplary embodiments, the lower end of the housing includes a recess for securably receiving the end of a strut from another articulation assembly of the same kind and configuration, for connecting a pair of such articulation assemblies together.

According to another aspect, there is provided a resonance testing apparatus having a plurality of aims configurable to support a workpiece for a resonance testing operation, wherein at least one of said arms incorporates an articulation assembly having: a strut, a joint element which is movable in response to movement of the strut, and a clamp arrangement for clamping the joint element, wherein the articulation assembly has a first condition in which the joint element is movable for reconfiguration of the arm and a second condition in which the clamp arrangement acts on the joint element to damp or restrict movement of the strut for a resonance testing operation.

In exemplary embodiments, one or more of the arms includes a resonance testing transducer for contact with the workpiece during testing.

In exemplary embodiments, the articulation assembly consists of an articulation assembly in accordance with the first or second aspects set out above.

According to a further aspect, there is provided a resonance testing apparatus having a plurality of arms configurable to support a workpiece for a resonance testing operation, wherein at least one of said arms incorporates an articulation assembly having: a joint element, a seating for the joint element, and a biasing arrangement for the seating, wherein the articulation assembly has a first condition in which the joint element is arranged on the seating and is movable on the seating for reconfiguration of the arm and a second condition in which the biasing arrangement acts on the seating to damp or restrict movement of the joint element on the seating to damp or restrict movement of the strut for a resonance testing operation.

In exemplary embodiments, one or more of the arms includes a resonance testing transducer for contact with the workpiece during testing.

In exemplary embodiments, the articulation assembly consists of an articulation assembly in accordance with the first or second aspects set out above.

According to a yet further aspect, there is provided a resonance testing apparatus having a plurality of arms configurable to support or contact a workpiece for a resonance testing operation, wherein at least one of said arms incorporates a plurality of hydraulic locking ball joints for permitting selective configuration of said arm relative to the other arms, the apparatus having a first condition in which the application of hydraulic pressure locks the ball joints against movement for a resonance testing operation and a second condition in which the release or absence of hydraulic pressure permits the ball joints to move for permitting re-configuration of said arm relative to the other arms.

In exemplary embodiments, one or more of the arms includes a resonance testing transducer for contact with the workpiece during testing.

In exemplary embodiments, at least two of said arms incorporate first and second hydraulic locking ball joints coupled in series, and the apparatus is configured so that the first hydraulic locking ball joints can be locked simultaneously, prior to locking of the second ball joints. In exemplary embodiments, each arm includes a third ball joint coupled in series to the second ball joint, and the apparatus is configured so that third ball joints can be locked simultaneously, after locking of the second ball joints.

In exemplary embodiments, each hydraulic locking ball joint consists of an articulation assembly in accordance with the first or second aspects set out above.

According to a further aspect, there is provided a resonance testing method, the resonance testing method comprising the steps of: providing a plurality of arms for contacting or supporting a workpiece for a resonance testing operation, arranging said plurality of arms in a first configuration relative to one another to contact or support a workpiece for a resonance testing operation, conducting a resonance testing operation on a workpiece contacted or supported by the arms in said first configuration; and reconfiguring the position of the arms relative to one another for the purpose of another resonance testing operation; wherein at least one of said arms incorporates one or more hydraulically-lockable articulation assemblies for permitting selective configuration of said at least one arm relative to the other arms in said plurality of arms.

In exemplary embodiments, at least two of said arms incorporate multiple hydraulically-lockable articulation assemblies coupled to one another in series, wherein the method includes the step of simultaneously locking the lowermost articulation assembly in each or said arms, prior to locking the next level of articulation assembly in each arm.

In exemplary embodiments, one or more of the arms includes a resonance testing transducer for contact with the workpiece during testing.

In exemplary embodiments, each hydraulically-lockable articulation assembly consists of an articulation assembly in accordance with the first or second aspects set out above.

BRIEF DESCRIPTION OF THE DRAWINGS

Other aspects and features will be apparent from the appended claims and from the following description of exemplary embodiments, made by way of example only, with respect to the accompanying drawings, in which:

DETAILED DESCRIPTION OF THE PREFERRED EMBODIMENTS

Figure 1:
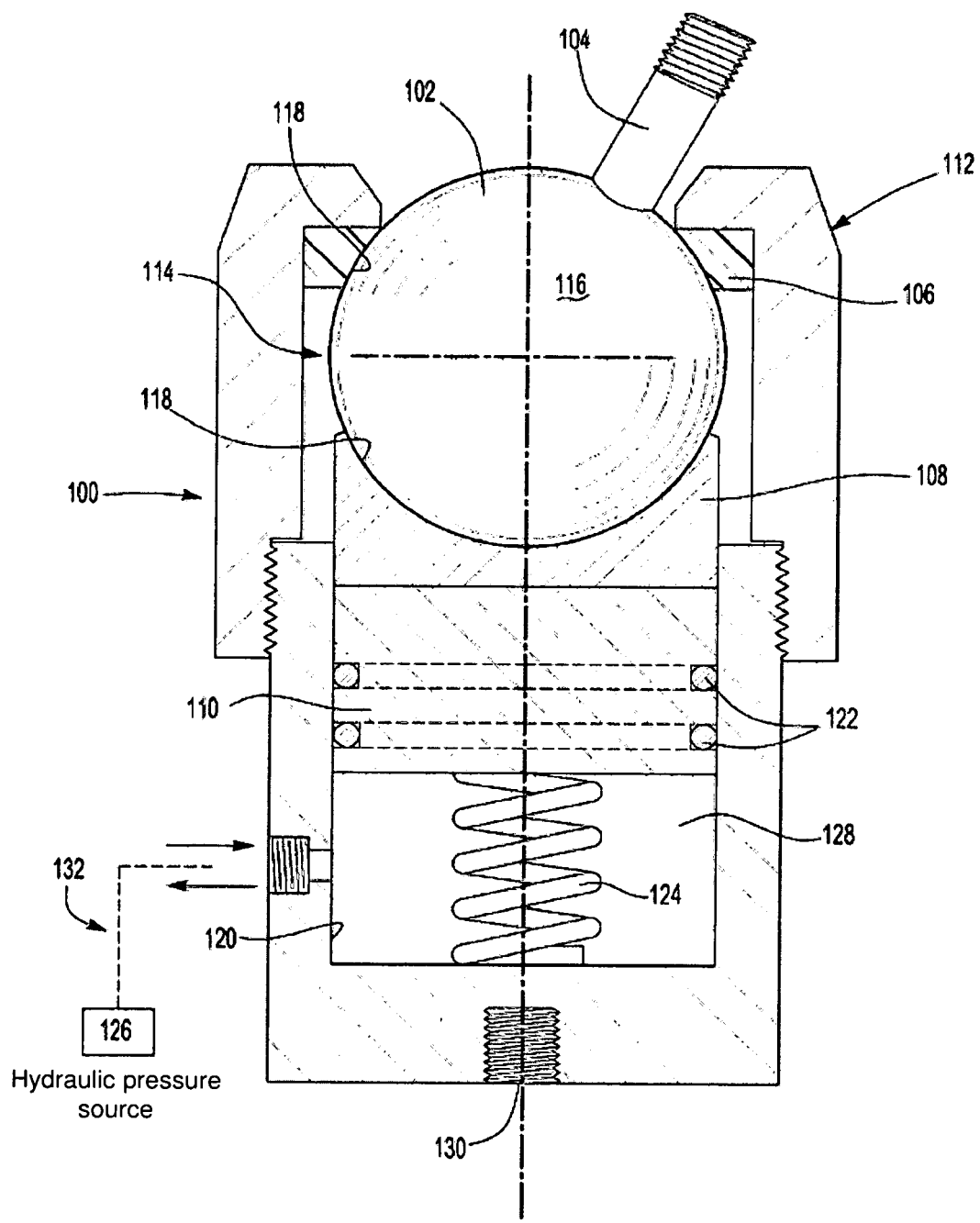
FIG. 1 is a schematic cross-sectional view of an hydraulically lockable articulation assembly.

Referring firstly to FIG. 1, an articulation is indicated generally at 100. The assembly 100 includes a joint element 102 having an integral strut 104. The joint element 102 is arranged for movement between opposing parts 106, 108. A piston 110 is movable to clamp the joint element 102 between the opposing parts 106, 108, in order to damp or restrict movement of the strut 104.

The opposing parts 106, 108 define a seating 114 in which the joint element 102 is movable (i.e. when the piston 110 is in a release position). In this embodiment, the joint element 102 is in the form of a ball element 116, permitting three degrees of freedom. The opposing parts 106, 108 have complimentary curved surfaces 118 between which the ball element 116 is rotatable. Hence, the assembly 100 is a form of ball joint.

In other embodiments, the joint element 102 may take the form of an elongate roller element (not shown), in which case the seating parts may be configured for permitting only a single degree of freedom (about one axis).

In this embodiment, the ball element 116 is of metal construction and the seating parts 106, 108 are of plastics or resin material, for reducing wear of the metal ball element 116.

The upper most seating part 106 (as viewed in FIG. 1) is in the form of a ring, and the strut 104 extends through the ring.

The piston 110 is movable in a cylinder 120 arranged for communication with an hydraulic pressure source (indicated at 126) via an hydraulic circuit (indicated by dotted lines 132. The piston 110 is sealingly mounted in the cylinder 120 using o-ring seals 122, to prevent the egress of hydraulic fluid 128 towards the ball 116.

Other embodiments may be mechanically actuated, e.g. using an electric or electromagnetic linear actuator to drive the piston, or could be coupled to a pneumatic pressure source for driving the piston. However, an hydraulic system is envisaged (without limitation) for resonance testing applications.

The piston 110 is arranged to act on the lower of said seating parts 108, in order to clamp the ball element 116 against the upper of said seating parts 108. Hence, the opposing parts 106, 108 serve as a clamp arrangement for the joint element 102.

A spring 124 acts to bias the piston 110 in an apply direction in the cylinder 120, in order to provide a residual clamping force on the ball 116.

The ball 116 and seating parts 106, 108 are mounted in a housing 112. In this embodiment, the housing 112 has a longitudinal axis indicated at 134 and the piston 110 is concentric with that axis. In this illustrated embodiment, the upper seating part 106 is arranged at one end of the housing 112 and the piston 110 is arranged at an opposite end of the housing 112 (lowermost as viewed in FIG. 1). The strut 104 extends from the housing 112.

In use, the piston 110 is driven against the lowermost seating part 108, whereby the ball 116 is clamped against the uppermost seating part 106. Dependent upon the applied force, the strut 104 will be locked or damped against movement. However, in the absence of an applied force (or at a low applied force, e.g. from the spring 124) the ball is substantially free for movement in its seating, e.g. to allow for re-positioning of the strut 104.

In exemplary embodiments, an hydraulic (or pneumatic) system provides for locking the position of the strut against movement, e.g. for a resonance testing operation. In other embodiments, an hydraulic (or pneumatic) system provides for variable damping of strut movement, e.g. by adjusting or releasing the applied pressure via the circuit 132.

Figure 2:
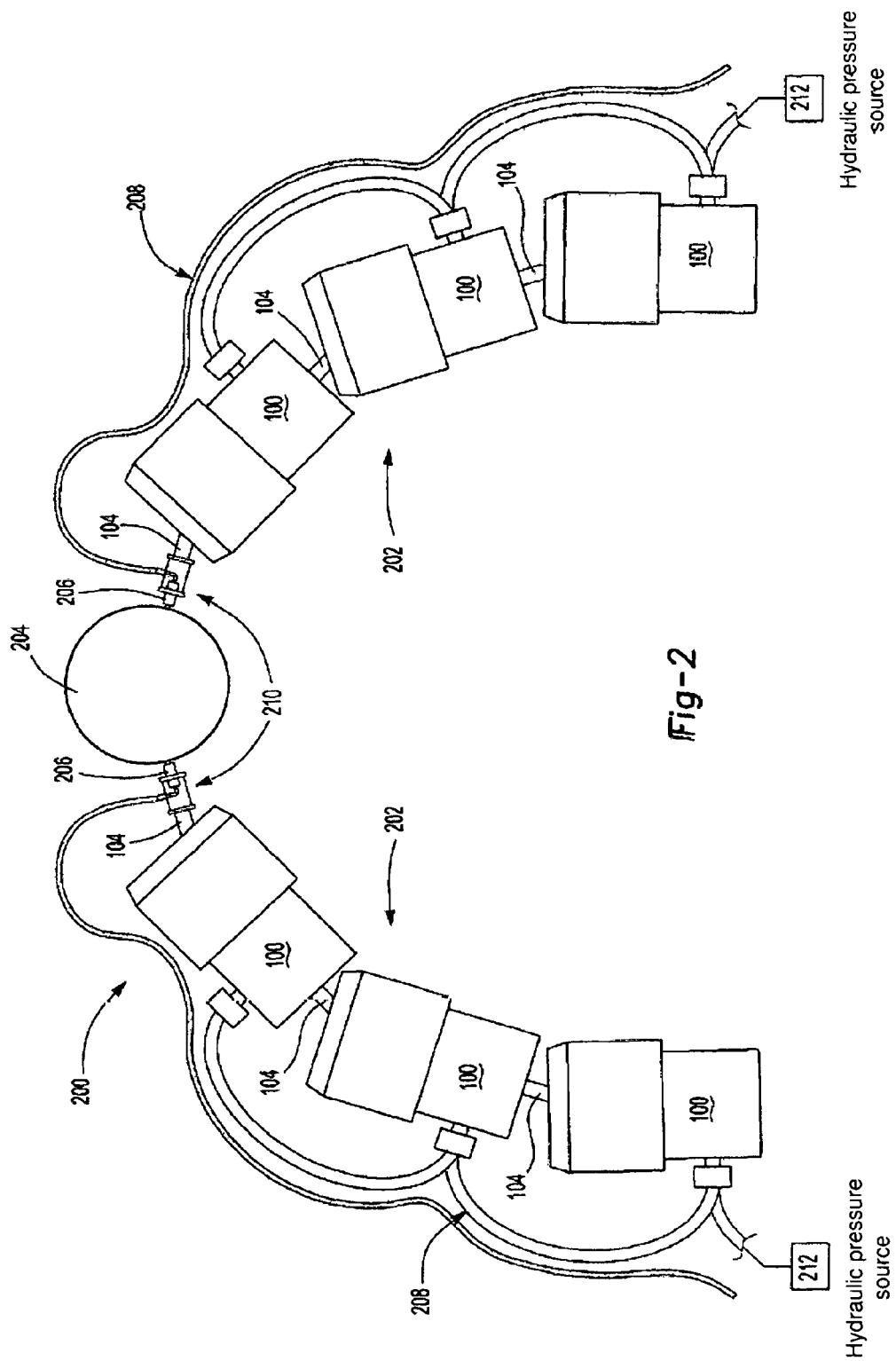
FIG. 2 is a schematic view from the side of a resonance testing arrangement incorporating a plurality of the articulation assemblies of FIG. 1.

The lower end of the housing 112 includes a recess 130 for securely receiving the end 128 of a strut 104 on another articulation assembly of the same kind and configuration, for connecting a pair of such articulation assemblies together in series (e.g. see FIG. 2). This may be by virtue of a threaded connection between the recess 130 and the end of the strut 104, for example.

FIG. 2 shows an example of a re-configurable support apparatus 200 suitable for resonance testing purposes. The apparatus 200 consists of multiple arms 202 (only two of which are shown) used to contact or support a workpiece 204 for a resonance testing operation.

Each arm 202 is made up of multiple articulation assemblies 100 of the kind shown in FIG. 1. For each arm 202, the articulation assemblies 100 are connected end to end, e.g. with the strut 104 on a first articulation assembly 100 engaged in a recess on the underside of a second first articulation assembly 100.

Each arm 202 has a distal end 210 with a resonance testing transducer 206, e.g. connected to or supported by the strut 104 of the upper most articulation assembly 100. The arms 202 are configurable so that the transducers 206 define a cradle for supporting or contacting the workpiece 204.

In exemplary embodiments, the apparatus 200 has three or more of said arms 202.

Each arm 202 has its own hydraulic supply line 208, for locking/releasing the articulation assemblies 100. In exemplary embodiments, the articulation assemblies 100 in each arm 202 are connected in series, in communication with a hydraulic source 212, via their respective supply line 208.

The position of each arm 202 can be locked against movement, e.g. via the application of hydraulic pressure through the supply line 208, since this activates the pistons to clamp the respective balls 116 and so prevent movement of the struts 104. When the pressure is released, the relative position of the arms 202 can be re-configured (e.g. to accommodate a different workpiece), since the balls 116 and, hence, the struts 104 will be movable. In exemplary embodiments, the hydraulic circuit is configured to permit independent locking/releasing of an individual articulation assembly in the apparatus 200.

In a further exemplary embodiment, the apparatus 200 has multiple arms 202, wherein each arm 202 includes two or more of said articulation assemblies 100. The apparatus 200 is configured so that the lowermost articulation assemblies 100 can be locked/released simultaneously, e.g. independently of the other articulation assemblies in the apparatus, via the hydraulic circuit 132. Similarly, the apparatus 200 is configured so that the next level of articulation assemblies 100 (i.e. above the lowermost articulation assemblies 100) can be locked/released simultaneously, e.g. independently of the lowermost articulation assemblies 100 and any other articulation assemblies 100 in the apparatus 200, via the hydraulic circuit 132. This enables a step-wise configuration of the apparatus 200, in which the position of a first level of articulation assemblies 100 can be simultaneously locked prior to locking of the next level of articulation assemblies 100 and so on to the uppermost level of articulation assemblies 100 in the arms 202.

The invention claimed is:

1. An articulation assembly having a strut, a joint element which is movable in response to movement of the strut, and a clamp arrangement for clamping the joint element, wherein the articulation assembly has a first condition in which the joint element is substantially free for movement and a second condition in which the clamp arrangement acts on the joint element to damp or restrict movement of the strut, wherein the articulation assembly further comprises a biasing arrangement, the biasing arrangement including a movable piston, and movement of the piston in a first direction causes the join element to be clamped between opposing clamp members of the clamp arrangement; and wherein the piston is movable in an apply direction corresponding to the first direction in response to at least one of pressure or a linear actuator input.

2. The articulation assembly according to claim 1 wherein the strut is locked against movement when the assembly is in the second condition.

3. The articulation assembly according to claim 1 wherein the strut extends from the joint element and is shaped to be connected to or integral with the joint element.

4. The articulation assembly according to claim 1 wherein the joint element is located between the opposing clamp members.

5. The articulation assembly according to claim 4 wherein the biasing arrangement is provided to cause the joint element to be clamped between the opposing clamp members.

6. The articulation assembly according to claim 1 wherein the piston is sealingly mounted in a cylinder arranged for communication with a pressure source.

7. The articulation assembly according to claim 6 wherein the piston is spring-biased in an apply direction in a cylinder.

8. The articulation assembly according to claim 1 wherein the clamp arrangement provides a seating for supporting the joint element.

9. The articulation assembly according to claim 8 wherein the seating is configured to permit movement of the joint element when the assembly is in the first condition.

10. The articulation assembly according to claim 9 wherein the joint element is of metal construction and the seating is of plastics or resin material.

11. The articulation assembly according to claim 1 wherein the joint element is spherical or substantially spherical.

12. The articulation assembly according to claim 1 wherein one of the clamp members defines a ring having an aperture through which the strut extends to the joint element.

13. The articulation assembly according to claim 1 wherein the joint element, clamp members and piston are mounted in a housing having an upper end and a lower end.

14. The articulation assembly according to claim 13 wherein the strut extends from the upper end of the housing.

15. The articulation assembly according to claim 13 wherein the lower end of the housing includes a recess for securably receiving the end of a strut from another articulation assembly of the same kind and configuration, for connecting a pair of such articulation assemblies together.

16. The articulation assembly according to claim 1 wherein the articulation assembly includes a strut or stud extending from the joint element and the joint element is movable in response to movement of the strut or stud when the assembly is in the first condition, whereas the strut is damped or restricted against movement when the assembly is in the second condition.

17. An articulation assembly, the articulation assembly including a joint element, a seating for the joint element, and a biasing arrangement for the seating, wherein the articulation assembly has a first condition in which the joint element is arranged on the seating and is substantially free for movement on the seating and a second condition in which the biasing arrangement acts on the seating to damp or restrict movement of the joint element on the seating, wherein the biasing arrangement includes a movable piston, and wherein when the articulation assembly is in the second condition, movement of the piston in a first direction causes the joint element to be clamped between opposing clamp members of a clamp arrangement; and wherein the piston is movable in an apply direction corresponding to the first direction in response to at least one of pressure or a linear actuator input.

18. The articulation assembly according to claim 17 wherein the joint element is locked against movement when the assembly is in the second condition.

* * * * *